Feb. 17, 1970 N. BOWNASS 3,495,721
MACHINE TOOL WORKPIECE TRANSFER DEVICE
Filed April 3, 1968 5 Sheets-Sheet 1

Norris Bownass
INVENTOR

BY Lawrence E. Laubscher
ATTORNEY

Norris Bownass
INVENTOR

BY
Lawrence E. Laubscher
ATTORNEY

Feb. 17, 1970     N. BOWNASS     3,495,721
MACHINE TOOL WORKPIECE TRANSFER DEVICE
Filed April 3, 1968     5 Sheets-Sheet 5

Norris Bownass
INVENTOR
BY
Lawrence E. Laubscher
ATTORNEY

United States Patent Office 3,495,721
Patented Feb. 17, 1970

3,495,721
MACHINE TOOL WORKPIECE TRANSFER DEVICE
Norris Bownass, Stevenage, England,
assignor to Ether Limited
Filed Apr. 3, 1968, Ser. No. 718,620
Int. Cl. B25j 11/00; B66c 23/56
U.S. Cl. 214—1  5 Claims

ABSTRACT OF THE DISCLOSURE

A workpiece transfer device for a machine tool comprises an arm pivotally movable between a first position in which a portion thereof cooperates with a workpiece holder of a machine tool to transfer a workpiece therebetween and a second position remote from said first position in which said workpiece is transferred between said arm and a store. The arm may define a channel into which a workpiece is transferred from the workpiece holder of a machine tool and along which the workpiece moves during transference to a store. Alternatively the arm carries a gripping device which cooperates with a workpiece holding device of a machine tool to transfer the workpiece between the holding device and a store.

---

This invention relates to automatic machine tools and in particular to means for removing completed workpieces from a position at which they are operated on by a succession of automatically advanced and retracted tools. In some embodiments the invention may also be employed for loading workpieces into a machine tool.

It is an object of the invention in one form to provide a machine tool workpiece transfer device having advantages in simplicity of construction.

It is a further object of this form of the invention to provide a machine tool workpiece transfer device comprising an arm pivotally movable between a first position in which a portion thereof cooperates with a workpiece holder of a machine tool to transfer a workpiece therebetween and a second position remote from said first position in which said workpiece is transferred between said arm and a store.

It is a further object of the invention to provide a machine tool workpiece transfer device comprising an arm forming a channel for said workpiece, said arm being pivotally movable between a first position in which a workpiece is transferred between a workpiece holder of said machine tool and an end of said channel and a second position in which said workpiece is transferred between the other end of said channel and a store.

It is an object of the invention in another form to provide a machine tool workpiece transfer device in which an arm carrying a workpiece gripping device is pivotally movable between a first position in which said gripping device cooperates with a workpiece holding device of said machine tool to transfer a workpiece therebetween and a second position in which said gripping device cooperates with a store to transfer said workpiece therebetween.

The features of the invention which are believed to be novel are recited with particularity in the appended claims. The invention, together with further features and advantages thereof, is best understood from the following description taken in conjunction with the drawings, in which:

Figure 1:
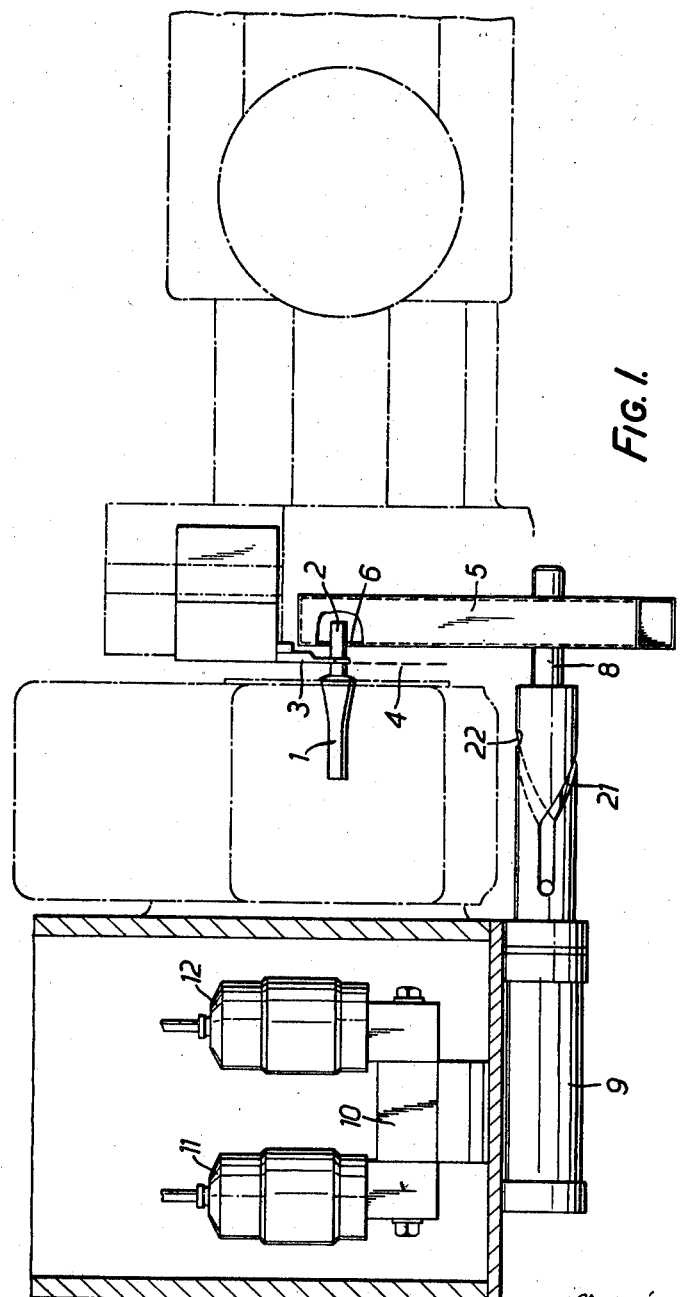
FIGURE 1 is a plan view of part of a machine tool showing an embodiment of the invention fitted thereon.
Figure 2:
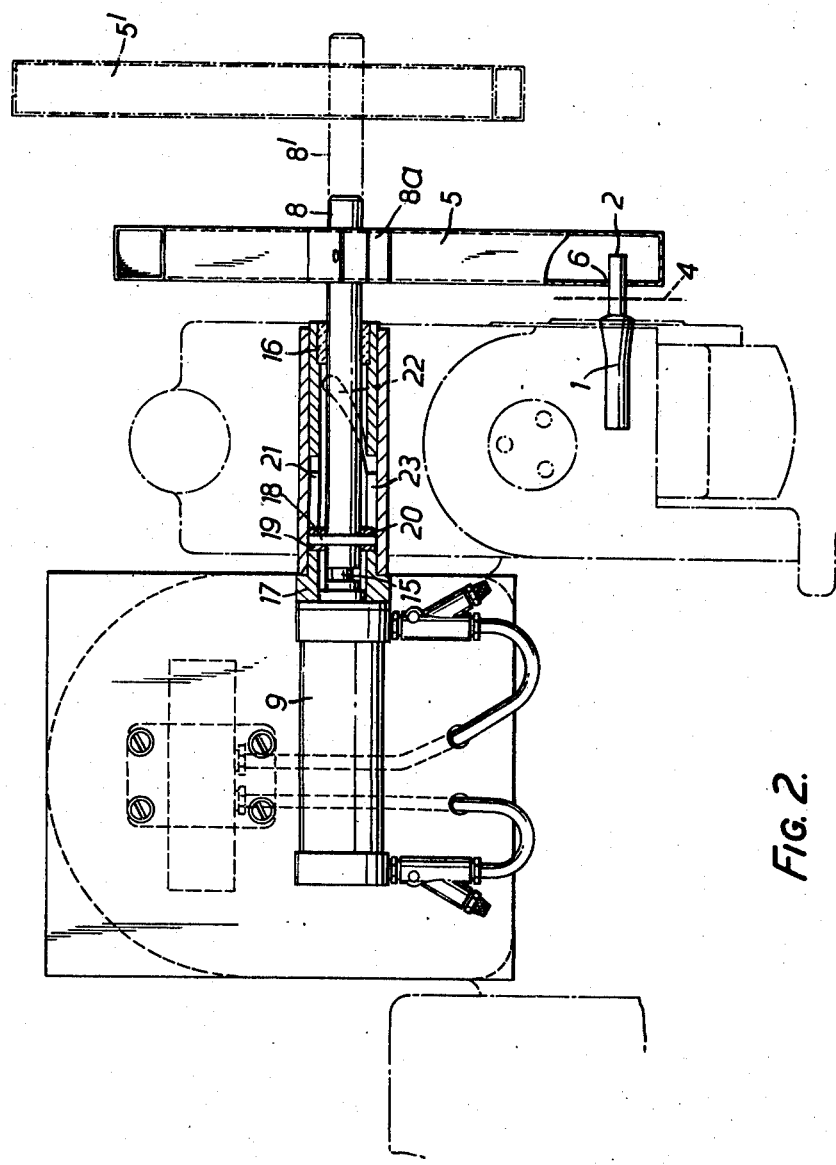
FIGURE 2 is a front elevation of the machine tool of FIGURE 1.
Figure 3:
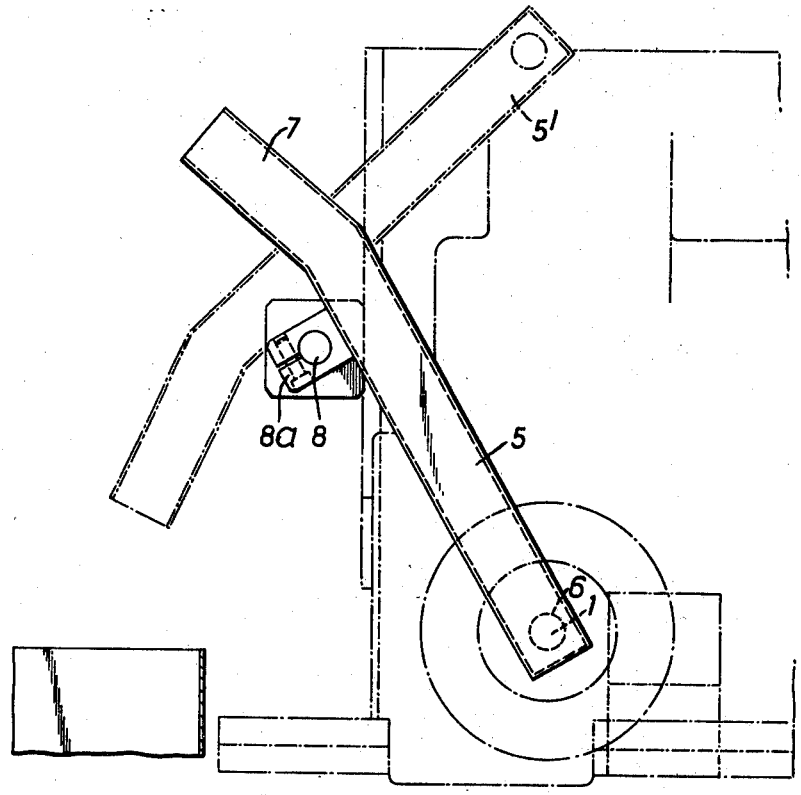
FIGURE 3 is an end elevation of the machine tool of FIGURES 1 and 2.

In the arrangement shown in FIGURES 1, 2 and 3 it is assumed that workpieces are shaped from bar stock in a rear-feed collet chuck 1. A finished workpiece 2, requiring only to be severed from the stock bar by a parting tool 3 (FIGURE 1) operating in the plane indicated by broken line 4, is shown as being a plain cylinder. Normally workpieces formed on such machine tools will be of more complex form, but this does not affect the present invention.

During at least the last portion of the operation of parting tool 3, a transfer receptacle 5 is positioned partly around workpiece 2, as shown. This receptacle comprises a tube of rectangular section, closed at one end, of which one side is pierced to define an aperture 6 to accept the workpiece 2. As shown in FIGURE 3, tubular transfer receptacle 5 may comprise a major rectilinear portion having a discharge portion 7 attached thereto at an angle.

When workpiece 1 has been parted from the stock bar it falls into transfer receptacle 5, which then moves at first axially away from collet 1 and then angularly about the axis of a shaft 8, upon which it is mounted by means of a clamping member 8a, to the position shown in broken line at 5' in FIGURES 2 and 3. The workpiece thus falls by gravity down the tube and is discharged from its open end into a suitable receptacle (not shown).

Figure 4:
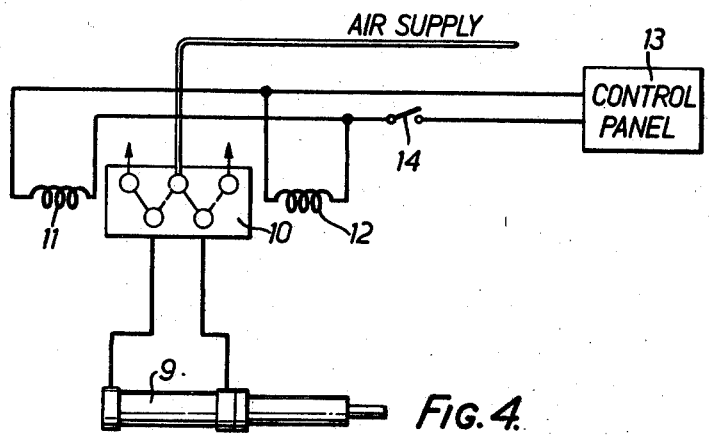
FIGURE 4 is a circuit diagram showing control arrangements for the embodiment of the invention described in relation to FIGURES 1, 2 and 3.

The means for producing the required movement of transfer receptacle 5 may conveniently be as shown, comprising a pneumatic cylinder 9 controlled by an electromagnetically operated air valve 10, which connects a compressed air supply to one or the other end of the cylinder 9. Valve 10 is actuated by twin solenoids 11 and 12, which may be energized from a power supply 13 under the control of a switch 14, as shown in FIGURE 4.

When switch 14 is open, valve 10 operates to apply compressed air to the gland end of cylinder 9, so that the piston contained in the cylinder is driven towards the tail end of the cylinder, moving piston rod 15 leftward to the position shown in FIGURE 2. Piston rod 15 is attached to shaft 8 upon which the transfer receptacle 5 is mounted. This shaft is supported for both axial and rotary movement by a sleeve bearing 16, carried in a tubular member 17 secured to the cylinder. Shaft 8 is diametrically pierced to accept a cross-pin 18 carrying on its ends roller members 19, 20 which are guided by symmetrical slots 21, 22 formed in tubular member 17. A tubular cover member 23, omitted in FIGURE 1 for the sake of clarity in illustration, closes slots 21, 22 against the ingress of dirt.

The form of slots 21, 22 is such that during the first half of its outward movement shaft 8 moves without rotation, since guide rollers 19, 20 move along portions of the guide slots which lie in a common plane with the shaft axis. Thereafter the guide slots become helical, so that a rotary movement is superimposed upon the axial translatory movement of the shaft 8. This transfer receptacle 5 is initially moved parallel to itself away from collet 1 and then rotated to discharge the workpiece which it contains. In the rotated position 5', the receptacle is removed from the working position, which is thus left clear for the operation of tools upon the workpiece.

When all operations save the final parting are effected, switch 14 is opened to cause valve 10 to return to its inoperated position, in which air is fed to the gland end of cylinder 9, thus causing receptacle 5 to reverse its movement, first returning to the position in which aperture 6 lies on the collet axis and then being translated axially so that the aperture embraces the workpiece, now in process of being parted from the stock bar, and is positioned to receive the parted workpiece as it falls away.

Figure 5:
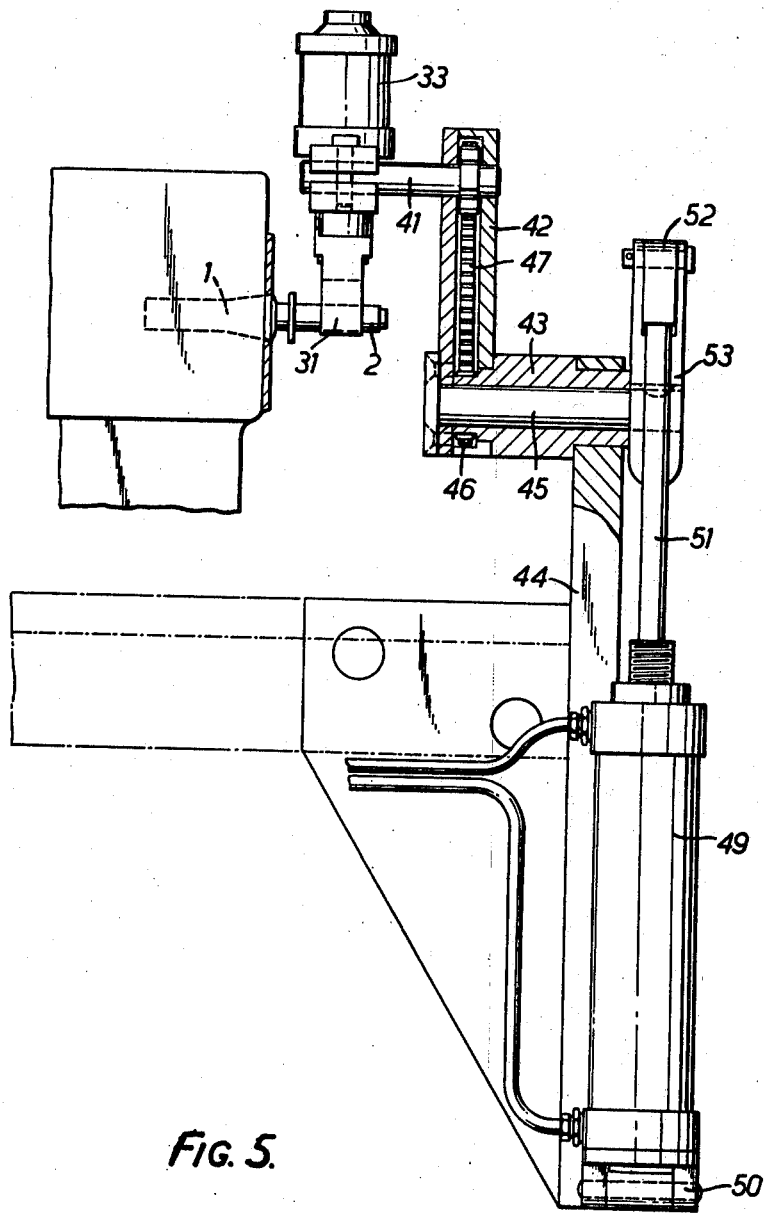
FIGURE 5 is a partly sectional front elevation of a part of a machine tool showing another embodiment of the invention fitted thereon.

In the arrangement shown in FIGURES 5 and 6, a collet 1 again holds bar stock upon which workpieces such as 2 are formed. To remove the finished workpiece in this embodiment there is employed a pair of hinged fingers 31, 32 which are actuated by an air cylinder 33, preferably controlled by a solenoid-operated valve (not shown). When air pressure is released from the cylinder, an internal compression spring 34 raises the piston to urge fingers 31, 32 together, thus gripping the workpiece. Fingers 31, 32 are respectively pivoted at 35, 36 to an extension of the cylinder cover and are provided with slotted extensions, such as 37, in which engages a transverse pin 38 held in piston rod 39 of cylinder 33. The position of fingers 31, 32 when opened by the application of air pressure to cylinder 33 is shown in broken line 31a, 32a in FIGURE 6.

Figure 6:
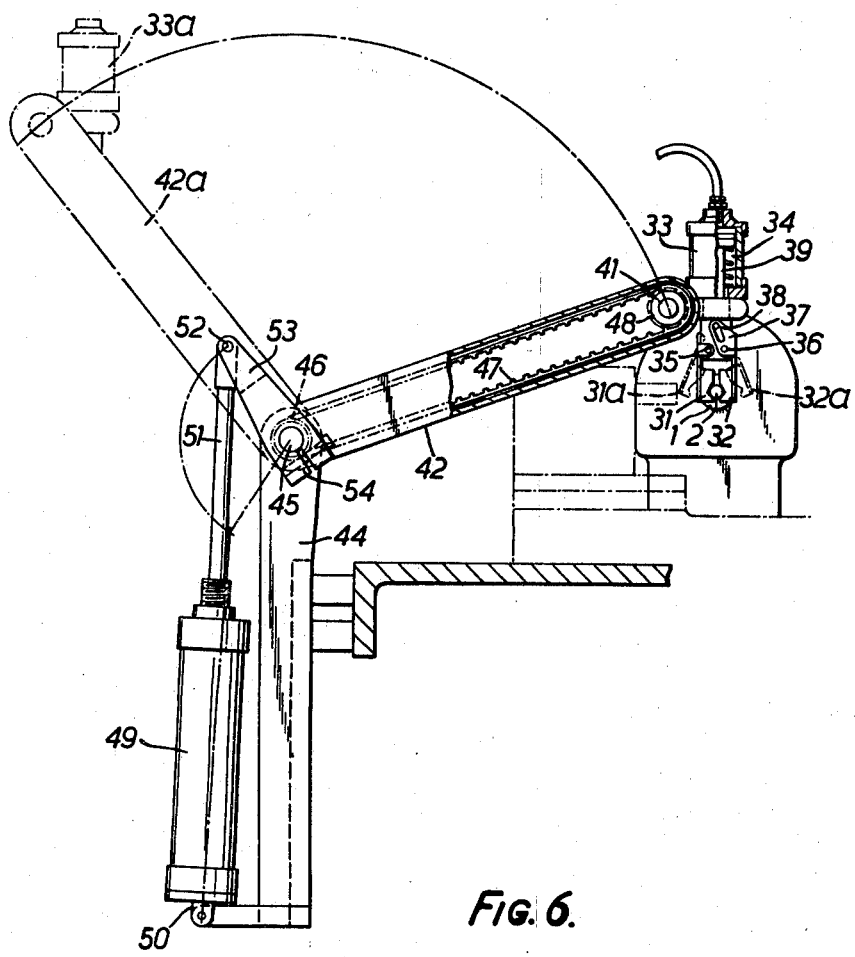
FIGURE 6 is a partly sectional side elevation of the machine tool of FIGURE 5.

Cylinder 33 is carried on a mounting bracket 40 clamped upon a splindle 41 mounted for rotation in a hollow lever 42. Lever 42 is pivoted upon a fixed sleeve member 43 fixed in a bracket member 44 and is fastened to a spindle 45 passing through the sleeve and bracket. A sprocket wheel 46 fastened on a portion of sleeve member 43 within hollow lever 42 engages an internally toothed belt 47 which passes along the cavity within lever 42 to engage also a further sprocket 48 secured to shaft 41. Sprockets 46 and 48 are of the same diameter, so that during rotation of lever 42 about its pivot cylinder 33 moves always parallel to its initial position, as indicated in FIGURE 6, where an alternative position of the cylinder and lever is shown in broken line at 33a, 42a. Movement of lever 42 about its pivot is controlled by an air cylinder 49, pivoted to bracket member 44 at 50. The piston rod 51 of cylinder 49 is pivoted at 52 to a divided crank member 53 clamped at 54 to spindle 45. When the piston in cylinder 49 is driven upwards, lever 42 adopts the position shown in full line, in which fingers 31, 32 may engage a workpiece being parted from the bar stock held in collet 1. When parting is complete the air pressure is applied to the upper end of cylinder 49, so that lever 42 is swung away from collet 1, carrying with it the workpiece held by fingers 31, 32. When lever 42 reaches its second limiting position 42a, air pressure is applied to finger cylinder 33 to release the workpiece. The released workpiece may then fall into a receptacle, or may be accepted by a work holder of another machine tool which will perform further operations upon it.

While particular embodiments of the invention have been shown and described, it is apparent that changes and modifications may be made without departing from the invention in its broader aspects.

I claim:

1. Workpiece transfer apparatus for use with a machine tool having a workpiece holder, comprising:
   a support adapted for connection with said machine tool;
   an elongate arm containing a conduit that is closed at one end and open at the other, said arm containing also adjacent its closed end an aperture through which a workpiece may be inserted into said conduit;
   means pivotally connecting said arm with said support for pivotal movement about a generally horizontal axis, said arm having a loading position in which the closed end is lowermost and said aperture is opposite said workpiece holder;
   an actuator means for pivoting said arm to a discharge position in which the open end is lowermost to permit the gravity discharge of a workpiece from the conduit.

2. Apparatus as defined in claim 1, wherein said pivotal connecting means comprises:
   a rod connected with and extending from said arm;
   bearing means supporting said rod for rotation about said pivot axis, said bearing means including a tubular member containing at least one generally longitudinally extending curved slot;
   and guide means extending from said rod to engage said slot, said slot being of such a configuration as to effect axial movement of said rod and corresponding lateral movement of said arm during the pivotal movement of said arm between said loading and discharge positions.

3. Apparatus as defined in claim 2, wherein said tubular member contains a pair of said slots in diametrically opposed relationship, and further wherein said guide means comprises a pin mounted in a diametrically extending bore contained in said rod, said pin extending at opposite ends into said slots, respectively, and rollers mounted on the ends of said pin, respectively, for engagement with said slots.

4. Apparatus as defined in claim 2, wherein said actuator means comprises:
   a fluid pressure motor including a cylinder, and a piston mounted for reciprocation in said cylinder;
   valve means for selectively controlling the direction of movement of said piston in said cylinder;
   and coupling means for coupling said rod with said piston for reciprocatory movement therewith.

5. Apparatus as defined in claim 2, wherein said conduit means has a rectangular cross section.

References Cited

UNITED STATES PATENTS

| 1,405,796 | 2/1922 | Middlemiss | 214—90 |
| 2,924,718 | 2/1960 | Packard. | |
| 3,095,082 | 6/1963 | Allgeyer. | |

GERALD M. FORLENZA, Primary Examiner

G. F. ABRAHAM, Assistant Examiner

U.S. Cl. X.R.

193—17; 214—130, 146.5